US010675648B2

(12) United States Patent
Holloway et al.

(10) Patent No.: US 10,675,648 B2
(45) Date of Patent: Jun. 9, 2020

(54) REMOTELY OPERATED DEVICE

(71) Applicant: Q-Bot Limited, Greater London (GB)

(72) Inventors: Mathew Holloway, London (GB);
Christopher Hamblin, London (GB);
Daniel Taylor, London (GB)

(73) Assignee: Q-Bot Limited, London (GB)

( * ) Notice: Subject to any disclaimer, the term of this patent is extended or adjusted under 35 U.S.C. 154(b) by 240 days.

(21) Appl. No.: 15/743,182

(22) PCT Filed: Jul. 13, 2016

(86) PCT No.: PCT/GB2016/052116
§ 371 (c)(1),
(2) Date: Jan. 9, 2018

(87) PCT Pub. No.: WO2017/009642
PCT Pub. Date: Jan. 19, 2017

(65) Prior Publication Data
US 2019/0118206 A1    Apr. 25, 2019

(30) Foreign Application Priority Data

Jul. 13, 2015   (GB) .................................. 1512225.2
Oct. 22, 2015   (WO) ................ PCT/GB2015/053175
Apr. 27, 2016   (GB) .................................. 1607338.9

(51) Int. Cl.
*B05B 13/00*    (2006.01)
*B05B 13/04*    (2006.01)
(Continued)

(52) U.S. Cl.
CPC .......... *B05B 12/122* (2013.01); *B05B 13/005* (2013.01); *B05B 13/0278* (2013.01);
(Continued)

(58) Field of Classification Search
CPC . B05B 12/122; B05B 13/005; B05B 13/0278; B05B 13/0431; B25J 1/02;
(Continued)

(56) References Cited

U.S. PATENT DOCUMENTS 2,607,622 A    8/1952 Doepke
4,218,989 A    8/1980 Fujita
(Continued)

FOREIGN PATENT DOCUMENTS

CN    102696570 A    10/2012
CN    204220360 U     3/2015
(Continued)

OTHER PUBLICATIONS

International Search Report for International Application No. PCT/GB2016/052116 dated Oct. 31, 2016, 2 pages.
(Continued)

*Primary Examiner* — Darren W Gorman
(74) *Attorney, Agent, or Firm* — Seyfarth Shaw LLP

(57) ABSTRACT

Apparatus for spraying a material on a surface comprises at least one elongate member (408) having a distal end and a proximal end, at least one spray nozzle (1404) mounted at the distal end of the elongate member for spraying the material in a spray pattern, a ground-engaging member (1420) mounted at the distal end of the elongate member and arranged to facilitate translational movement of the apparatus over a ground surface, a camera (1406) mounted at the distal end of the elongate member (1408) and connected to a camera output, the camera being arranged for capturing images of the spray pattern and the camera output being arranged to facilitate the viewing of images of the spray pattern from the proximal end of the elongate member, and a control mechanism arranged to control the operation of the spray nozzle from the proximal end of the elongate member.

21 Claims, 14 Drawing Sheets

(51) Int. Cl.
*B25J 1/08* (2006.01)
*B25J 5/00* (2006.01)
*B25J 1/02* (2006.01)
*B25J 11/00* (2006.01)
*B05B 12/00* (2018.01)
*B05B 12/18* (2018.01)
*B05B 12/12* (2006.01)
*B25J 19/02* (2006.01)
*B05B 13/02* (2006.01)
*B25J 9/06* (2006.01)

(52) U.S. Cl.
CPC ............ *B05B 13/0431* (2013.01); *B25J 1/02* (2013.01); *B25J 1/08* (2013.01); *B25J 5/00* (2013.01); *B25J 9/06* (2013.01); *B25J 11/0075* (2013.01); *B25J 19/023* (2013.01); *B05B 12/00* (2013.01); *B05B 12/18* (2018.02)

(58) Field of Classification Search
CPC ......... B25J 1/08; B25J 5/00; B25J 9/06; B25J 11/0075; B25J 19/023
USPC .................... 239/146, 172, 750, 752–754
See application file for complete search history.

(56) References Cited

U.S. PATENT DOCUMENTS

| | | | |
|---|---|---|---|
| 4,323,196 A | 4/1982 | Logue | |
| 6,889,920 B2 | 5/2005 | Nance | |
| 8,757,514 B1 | 6/2014 | Perello | |
| 2004/0140379 A1* | 7/2004 | Dexter | B08B 3/02 239/754 |
| 2005/0045751 A1 | 3/2005 | Nance | |
| 2005/0139244 A1 | 6/2005 | Boke | |
| 2006/0038033 A1* | 2/2006 | Daley | B05B 15/62 239/146 |
| 2006/0283981 A1 | 12/2006 | Mead | |
| 2008/0257908 A1 | 10/2008 | Reelick | |
| 2012/0072035 A1 | 3/2012 | Nielsen | |
| 2012/0187215 A1 | 7/2012 | Kirkpatrick | |
| 2014/0247338 A1* | 9/2014 | Kessler | E03F 7/12 348/84 |

FOREIGN PATENT DOCUMENTS

| | | |
|---|---|---|
| GB | 2101181 A | 1/1982 |
| GB | 2531576 A | 4/2016 |
| JP | H0757577 A | 3/1995 |
| JP | H10337544 A | 12/1998 |
| JP | 2000246205 A | 9/2000 |
| KR | 1020100108921 A | 10/2010 |
| KR | 101206766 B | 12/2012 |
| WO | 2014188221 A2 | 11/2014 |

OTHER PUBLICATIONS

Combined Search and Examination Report for Application No. GB1512225.2 dated Dec. 1, 2015, 10 pages.
International Preliminary Report on Patentability for International Application No. PCT/GB2015/053175 dated Apr. 25, 2017, 1 page.
Written Opinion for International Application No. PCT/GB2015/053175 dated Apr. 25, 2017, 8 pages.
Partial International Search Report for International Application No. PCT/GB2015/053175 dated Feb. 19, 2016, 5 pages.
Search Report for Application No. GB1607338.9 dated Nov. 18, 2016, 4 pages.

* cited by examiner

REMOTELY OPERATED DEVICE

CROSS REFERENCE TO RELATED APPLICATIONS

This is a National Stage application of PCT/GB2016/052116, filed Jul. 13, 2016, and claims priority to United Kingdom Patent Application s/n 1512225.2, filed Jul. 13, 2015, PCT/GB2015/053175, filed Oct. 22, 2015, and United Kingdom Application s/n 1607338.9, filed Apr. 27, 2016, the disclosures of which are incorporated herein by reference.

This invention relates to a remotely operated device for spraying a material on a surface of an enclosed space. Embodiments of the invention relate to a robotic device.

BACKGROUND

Our prior application WO 2014/188221 discloses robots for spraying expandable foam material. The present application discloses electromechanical arms that are alternatives to previous robotic vehicles.

BRIEF SUMMARY OF THE DISCLOSURE

The present disclosure provides apparatus for spraying a material on a surface. The apparatus comprises at least one elongate member having a distal end and a proximal end. The apparatus further comprises at least one spray nozzle mounted at the distal end of the elongate member for spraying the material in a spray pattern. The apparatus further comprises a ground-engaging member mounted at the distal end of the elongate member and arranged to facilitate translational movement of the apparatus over a ground surface. The apparatus further comprises a camera mounted at the distal end of the elongate member and connected to a camera output. The camera is arranged for capturing images of the spray pattern. The camera output is arranged for viewing images of the spray pattern from the proximal end of the elongate member. The apparatus further comprises a control mechanism arranged to control the operation of the spray nozzle from the proximal end of the elongate member.

As will be understood from the disclosure herein, the distal end of the elongate member refers generally to the end at which the spray nozzle is located. In some embodiments, the (or a further) elongate member may extend beyond the spray nozzle. Similarly, the proximal end of the elongate member refers generally to the other end of the elongate member from which the spray nozzle is controlled. In some embodiments, the (or a further) elongate member may extend beyond the region of the elongate member from where the spray nozzle is controlled.

Thus, there is provided a remotely operated apparatus for spraying a material on a surface and where an operator of the apparatus is located away from a spray nozzle of the apparatus. The distal end of the elongate member can therefore be considered to be a spray position and the proximal end of the elongate member can be considered to be an operator position, with the elongate member extending between the spray position and the operator positions. It will be understood that the distal end and the proximal end refer only to the extent of the elongate member between the spray position and the operator position; the apparatus may have a longitudinal extent beyond the distal end of the elongate member and/or beyond the proximal end of the elongate member.

In embodiments of the invention, the control mechanism is electrically connected to the spray nozzle for control thereof. Thus, the control mechanism may comprise controls for solenoids, motors and the like, which control operation of the spray nozzle. Alternatively or in addition, the control mechanism may be mechanical, for example utilising cables and the like to control the spray nozzle.

In embodiments of the invention, the spray nozzle is mounted for movement relative to the distal end of the elongate member. For example, the spray nozzle may be mounted for motorised movement relative to the distal end of the elongate member. In other embodiments of the invention, the spray nozzle may be fixed relative to the distal end of the elongate member. For example, the spray nozzle may be fixed at an angle to the distal end of the elongate member. A plurality of spray nozzles may be provided at different angles to the distal end of the elongate member.

The elongate member may be telescopically extensible. Alternatively or in addition, the elongate member may be extensible by the addition of one or more modular members. It will be understood that the term extensible in relation to the elongate member means that the length of the elongate member can be altered by changing a separation distance between the distal end and proximal end of the elongate member.

The apparatus may further comprise a support for the elongate member. The support may hold the elongate member relative to a surface of the working area. In embodiments of the invention, the elongate member is rotatably mounted to the support. For example, the elongate member may be mounted for rotational movement about a longitudinal axis thereof relative to the support. The support may comprise freely rotating wheels for engaging a surface of the working area.

The benefit of the apparatus disclosed herein is that it can fit in confined spaces and allow an operator to carry out operations and spray areas within the space whilst they remain outside, through an opening or entry point that easily allows direct access.

The spray nozzle and/or the camera may be mounted on a wheeled chassis at the distal end of the elongate member. The elongate member may be connected to the chassis via a pivotal connection. The chassis may comprise a plurality of mounting locations for the pivotal connection. In this way, the pivotal connection can be mounted to the chassis at a desired mounting location relative to the centre of gravity of the chassis. This allows the chassis to be steered more easily depending on the type of terrain to be negotiated.

One embodiment of the invention is a spray nozzle at the end of an extendable pole or arm, which is manually moved into position. The pole or arm may be extended by sliding it along the ground, through a telescopic mechanism, or by adding modules to extend the length. One of more spray nozzles are remotely operable by using a solenoid switch, air valve or other means. The spray nozzles can be angled and positioned to get the required coverage depending on the physical characteristics of the space and desired spray pattern (a number of pre-set positions may be available to suit typical conditions). A camera provides feedback to the operator of what is sprayed. There is a screen, handle and trigger (or switch) for the operator at the other end of the arm. Turning the handle allows the operator to extend the telescopic arm. The pole or arm houses the hoses that feed insulation to the spray nozzles. Depending on the type of insulation they may be insulated or heated. The benefit of this system is it provides an intuitive and easy to operate tool to remotely apply insulation in tight spaces.

In some cases, it is desirable to be able to remotely move the spray nozzles. This means that the arm only needs to be roughly positioned in the right place and a larger area can be covered from a single position. This may take one of a number of different embodiments which are either directly controlled by the operator or via a motor or other powered means. The simplest version includes the spray nozzle mounted at a pre-set angle which can be rotated directly by the operator turning a handle where the motion is transmitted through the pole or arm. A collar with wheels or legs allows the arm to rotate while the arm is held off the ground. Alternatively the rotation may be controlled by a motor and wrist. Alternatively the spray nozzle may be mounted on a gun platform with two axis of rotation to allow full control of the spray pattern via motors and a gearbox.

To help the operator manoeuvre the arm, a sled, ball or wheels may be used on a support for the arm. These wheels may have their axle in line with the arm allowing the arm to be moved side to side more easily, or be mounted so the axle is perpendicular to the arm and making it easier for the arm to be pushed into and out of the void.

Alternatively the arm may be held in place, so that it is suspended above the ground (normally at the entry point to a void, or via an anchor within the void).

The ground-engaging member may comprise a support member provided with a sled, a ball or wheels. Thus, the ground-engaging member is able to move over the ground surface in a translational manner by sliding (using a sled) or by rolling (using a ball or wheels).

The ground-engaging member may be arranged to facilitate translational movement of the apparatus over the ground surface in a direction having at least a component along a longitudinal axis of the elongate member. In this way, pulling or pushing the elongate member in the longitudinal axis of the elongate member can move the apparatus over the ground surface by translational movement of the ground-engaging member on the ground surface. The direction of movement of the apparatus may be substantially aligned with the longitudinal axis of the elongate member. The ground-engaging member may be arranged to facilitate translational movement of the apparatus forwards and backwards along substantially only a single direction.

The sled may define a ground-engaging surface arranged to contact the ground surface. The ground-engaging surface may be slidable relative to the ground surface, in use, and may be rigidly connected to the elongate member. The ground-engaging surface may be smooth. The ground-engaging surface may be a low friction surface. The ground-engaging surface may be metallic. The sled may be configured to be slidable along only the single direction.

The ground-engaging surface may define a convex profile. The convex profile may be in a direction transverse to a longitudinal axis of the elongate member. The ground-engaging surface may define a plurality of convex profiles to facilitate translational movement of the ground-engaging surface in a direction between the plurality of convex profiles.

The ground-engaging surface may comprise a plurality of ground contact points each arranged to contact the ground surface at one or more of a plurality of rotation angles of the elongate member about the longitudinal axis. The ground-engaging surface may be arranged such that the elongate member extends upward from the ground surface, in use, at an angle of between 0 degrees and 45 degrees.

The ground contact points may be arranged such that a rotation of the elongate member about the longitudinal axis away from a default rotational position raises a centre of mass of the apparatus away from the ground surface, whereby to impart a gravitational restoring force on the apparatus to return the elongate member to the default rotational position. Thus, the apparatus can be self-centring.

In one embodiment, the support member may comprise a wheeled unit. It will be apparent that the wheeled unit may be a tracked unit comprising one or more wheels within one or more tracks, or may be a direct wheeled unit comprising a plurality of wheels arranged to be in contact with the ground surface, in use.

The wheeled unit may comprise freely rotating wheels for engaging the ground. The wheeled unit may comprise one or more driven wheels.

The wheeled unit may comprise a front wheel set and a rear wheel set. The apparatus may further comprise a further support member mounted between the distal end and the proximal end of the elongate member and arrangeable to function as a fulcrum to suspend the rear wheel set away from the ground, whereby to steer the wheeled unit. It will be appreciated that in embodiments of the apparatus comprising the sled, the apparatus may further comprise a further support member mounted between the distal end and the proximal end of the elongate member and arrangeable to function as a fulcrum to suspend a rear portion of the sled away from the ground, whereby to steer the sled by rotation of the sled on a front portion of the sled arranged to be in contact with the ground. Thus, the apparatus can be repositioned to facilitate movement one at a time of a plurality of directions.

The spray nozzle may be configured to be mounted at an angle relative to the ground surface. The angle may be selectable from a plurality of predefined angles.

The spray nozzle may be rotatably mounted at the distal end of the elongate member.

The spray nozzle may be mechanically connected to the elongate member such that rotation of the elongate member about a longitudinal axis of the elongate member sweeps a path of the spray nozzle through an arc. In embodiments, the spray nozzle may be mechanically connected to a shaft member within the elongate member such that rotation of the shaft member about the longitudinal axis of the elongate member sweeps a path of the spray nozzle through an arc. The spray nozzle may be mechanically connected to a motor such that rotation of a motor shaft of the motor sweeps a path of the spray nozzle through an arc. Thus, the spray nozzle can be configured to spray material over a plurality of regions of a surface.

The spray nozzle may be mounted to the ground-engaging member.

The apparatus may further comprise a handle at the proximal end of the elongate member. The handle may be shaped to facilitate rotation of the elongate member by rotation of the handle. Thus, the handle can be used to rotate the elongate member about a longitudinal axis of the elongate member.

At least a portion of the elongate member may be removably attached to the ground-engaging member. Thus, the elongate member may be configured to be removable from the ground-engaging member during an installation process or a recovery process. In this way, the apparatus can be considered to be a modular apparatus. The elongate member may comprise a plurality of modular elongate members inter-engageably connected whereby to form the elongate member.

The elongate member may be extendable, whereby to extensibly connect the proximal end and the distal end of the elongate member.

The spray nozzle may be connected to a spray material input. The spray material input may connected to a reservoir of spray material. The spray material input may be provided at the proximal end of the elongate member. The reservoir of spray material may be provided at the distal end of the elongate member. The reservoir may be provided between the proximal end and the distal end of the elongate member. The reservoir may be provided at the proximal end of the elongate member.

It will be appreciated that the present disclosure envisages an embodiment where the spray material input is provided at the proximal end of the elongate member, and where a connection between the spray material input and the spray nozzle occurs anywhere between the proximal end and the distal end of the elongate member.

The camera output may be at the proximal end of the elongate member. The camera output may be connected to the camera by wires. The camera output may be wirelessly connected to the camera. The camera output may be connected an electronic display for displaying images from the camera.

BRIEF DESCRIPTION OF THE DRAWINGS

Embodiments of the invention are further described hereinafter with reference to the accompanying drawings, in which.

DETAILED DESCRIPTION

As used herein, the term "robotic" refers to a device whose movements can be controlled remotely and/or by stored programming. The device may operate autonomously, semi-autonomously or entirely under operator control. In embodiments, a remotely operated device can be a robotic device. The robotic device can include mechanical components which may be controlled remotely by an operator or by control circuitry on board or remote from the robotic device. The robotic device can be controlled automatically, semi-automatically, or may operate entirely under operator control. The robotic device may be a manually controlled device which is remotely operated.

Figure 1:
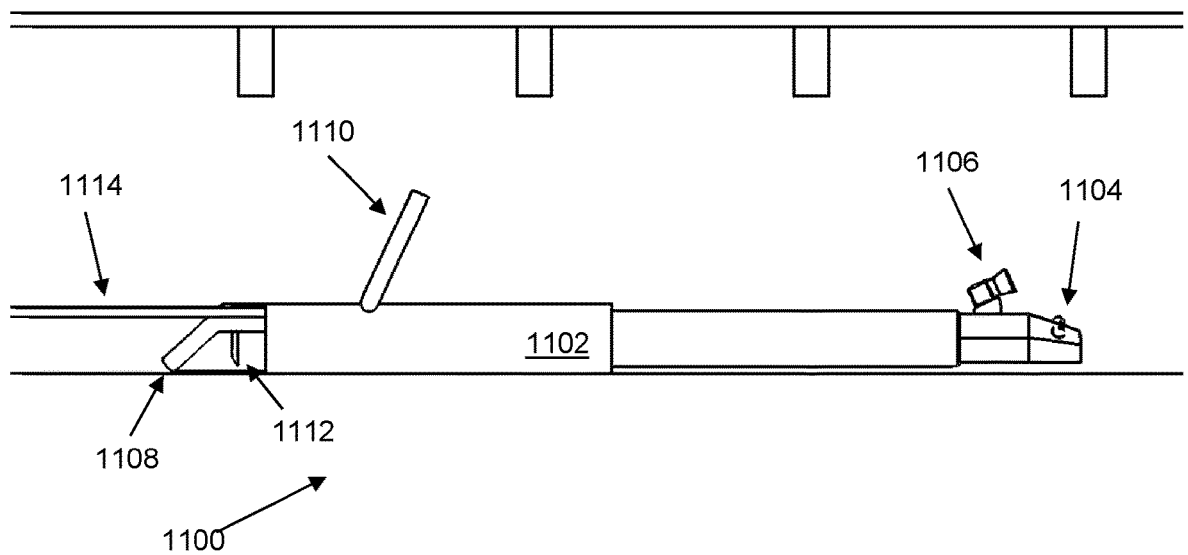
FIGS. 1 and 2 show an embodiment of an electromechanical arm according to the present disclosure.
Figure 2:
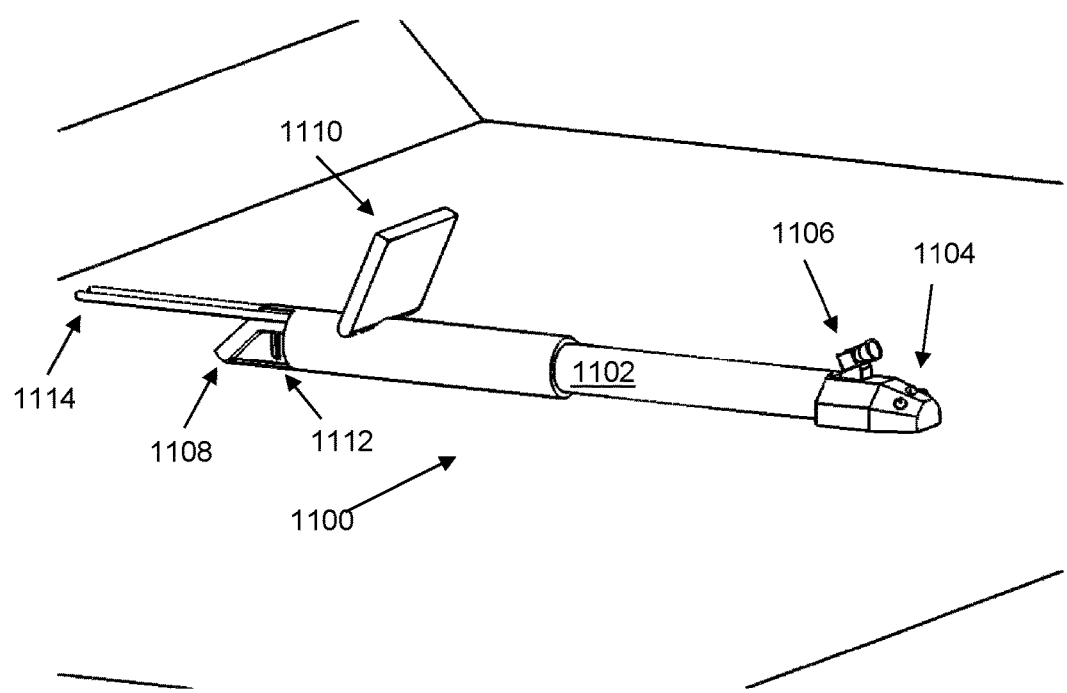

FIGS. 1 and 2 are illustrations of an embodiment of a remotely operated device in the form of an electromechanical arm according to the present disclosure, viewed from the side and an isometric view respectively. The electromechanical arm 1100 comprises an elongate member in the form of an extendable pole 1102, and a spray gun 1104 comprising three spray nozzles provided at a distal end of the extendable pole 1102. A camera 1106, also provided at the distal end of the extendable pole 1102, is arranged to provide feedback to an operator of the electromechanical arm 1100 of what is sprayed by the spray gun 1104. A range finder may be mounted next to the camera 1106. A handle 1108, display in the form of a display screen 1110, and a trigger 1112 are provided at a proximal end of the extendable pole 1102, opposite the distal end. The electromechanical arm 1100 is configured to be manually moved into position. The electromechanical arm 1100 is usable for spraying insulation foam within a void of a building. In the present embodiment, the extendable pole 1102 is extended using a telescopic mechanism. It will be appreciated that the reach of the electromechanical arm 1100 can be further extended by sliding the whole electromechanical arm 1100 along the ground. In another embodiment, the extendable pole 1102 may be extended in length by adding modules to lengthen the extendable pole 1102. The spray gun 1104 is remotely operable by using a solenoid switch, air valve or other means via the trigger 1112 at the handle 1108. The spray nozzles on the spray gun 1104 are configurable to be angled and positioned to get the required coverage depending on the physical characteristics of the space and desired spray pattern (a number of pre-set positions may be available to suit typical conditions). The telescopic mechanism for extending the extendable pole 1102 is operated by turning the handle 1108. The extendable pole 1102 houses hoses (not shown) that feed liquid insulation material to the spray gun 1104. As shown in FIG. 2, the hoses 1114 enter into the electromechanical arm 1100 alongside the handle 1108. Depending on the type of insulation the hoses 1114 may be insulated or heated. The benefit of this system is it provides an intuitive and easy to operate tool to remotely apply insulation in tight spaces.

In some embodiments, either or both of the screen and trigger may be provided remote from the arm. In this way, the operator may position the electromechanical arm 1100 within the void without needing to simultaneously see the display of a screen mounted on the electromechanical arm. The system may communicate to a pre-existing device such as phone, tablet or laptop, which may be used by the operator to view the display and control the arm.

Figure 3:
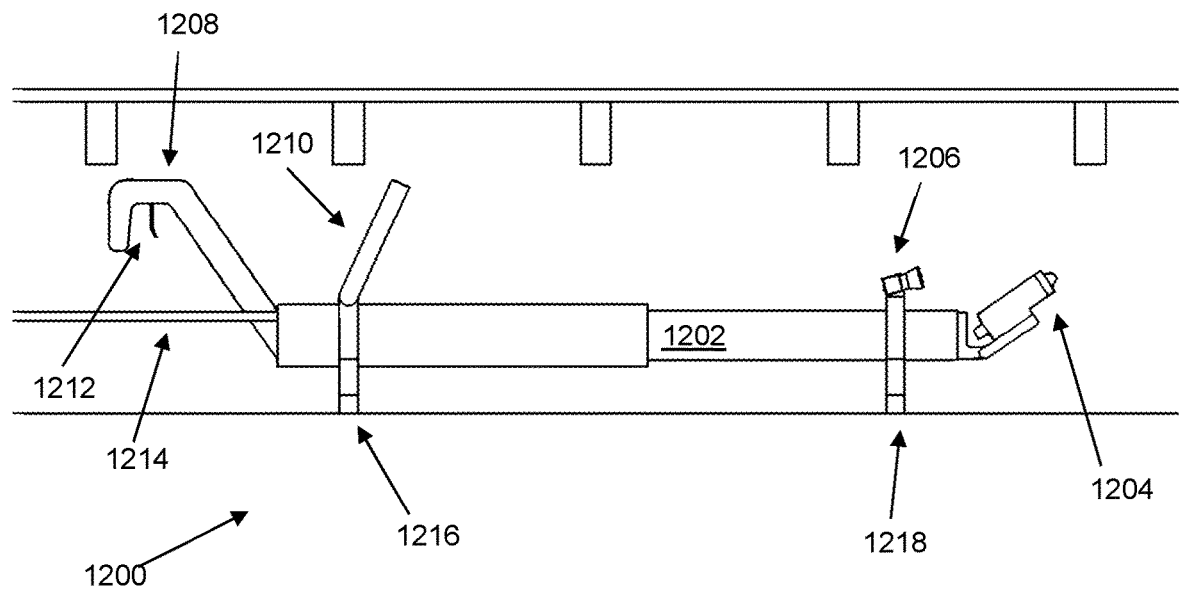
FIGS. 3 and 4 show an embodiment of an electromechanical arm according to the present disclosure.
Figure 4:
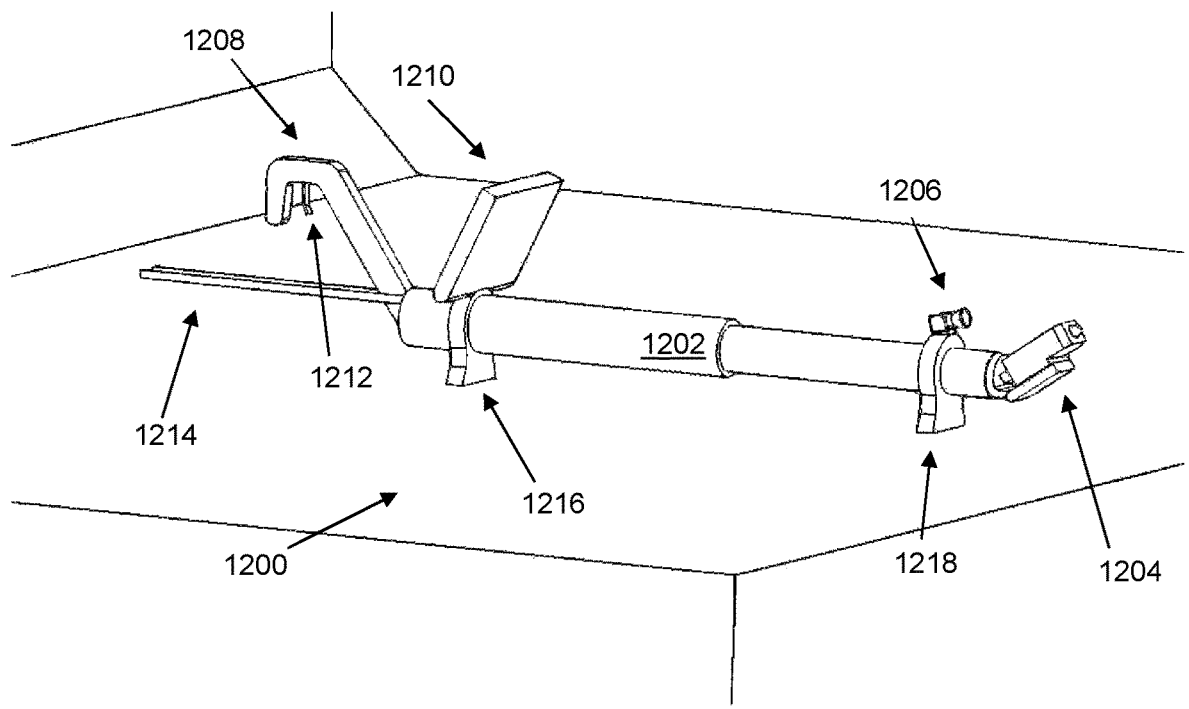

FIGS. 3 and 4 are illustrations of an embodiment of an electromechanical arm according to the present disclosure, viewed from the side, and an isometric view respectively. The embodiment of the electromechanical arm 1200 is substantially as described in relation to the electromechanical arm 1100 in FIGS. 1 and 2 apart from the hereinafter described differences. The electromechanical arm 1200 is supported by a front stand 1218 and a rear stand 1216. The stands 1216, 1218 hold the electromechanical arm 1200 off the ground. The front stand 1218 and the rear stand 1216 comprise a collar mechanism, allowing the extendable pole 1202 to rotate relative to the stand in order to turn the spray gun 1204. The stands 1216, 1218 allow the electromechanical arm 1200 to be placed on a substantially flat surface during operation. In this particular embodiment the spray gun 1204 comprises only a single nozzle, and is mounted at a preset angle to the vertical. Rotating the handle 1208 between a first position and a second position sweeps the path of the nozzle through an arc. In this way, insulation can be sprayed in a range of directions by rotating the handle 1208. By modifying the preset angle, it is possible to modify the arc through which the spray gun 1204 will travel. The camera 1206 is configured to remain static as the arm rotates. It will be appreciated that the camera 1206 may alternatively be mounted to the spray gun 1204, such that the camera 1206 moves with the rotational motion of the handle 1208. This will ensure that the camera is always pointing in the direction of spray of the spray gun. However, such an arrangement may disorient a user when viewed on the screen. In some embodiments, the camera may still be mounted on the front stand 1218, but be moveable independently of the spray gun 1204.

Figure 5:
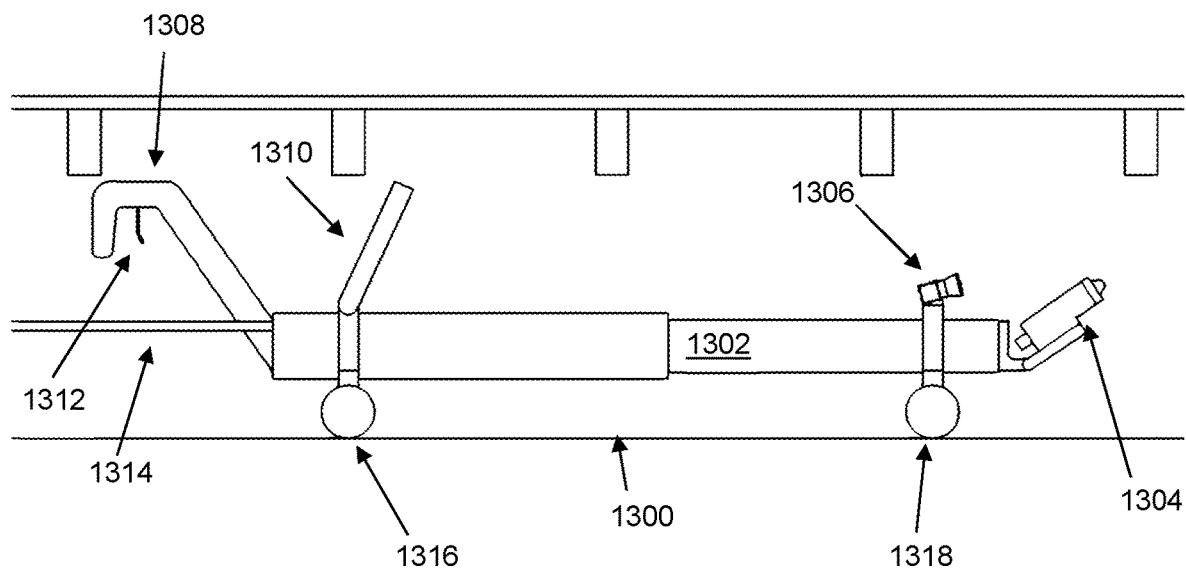
FIG. 5 shows an embodiment of an electromechanical arm according to the present disclosure.

FIG. 5 is an illustration of an embodiment of an electromechanical arm according to the present disclosure, viewed from the side. The electromechanical arm 1300 is substantially as described in relation to FIGS. 3 and 4, apart from the hereinafter described differences. Each of the stands 1316, 1318 comprise a pair of wheels to support the electromechanical arm 1300 off the surface on which it is to be operated. In particular, the wheels allow the electromechanical arm 1300 to easily be pushed along the surface, making it easier to manoeuvre the electromechanical arm 1300.

Figure 6:
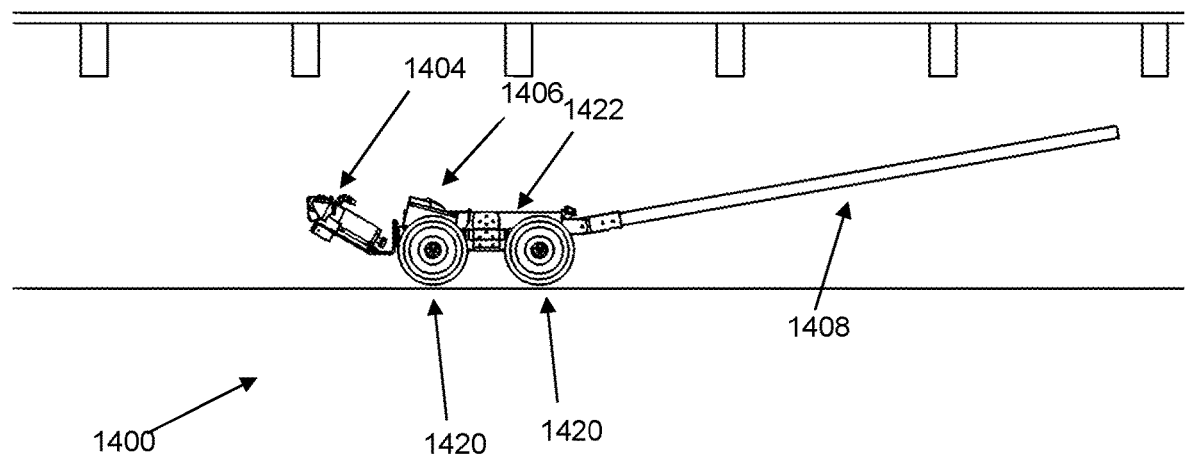
FIGS. 6 to 8 show an embodiment of an electromechanical arm according to the present disclosure.
Figure 7:
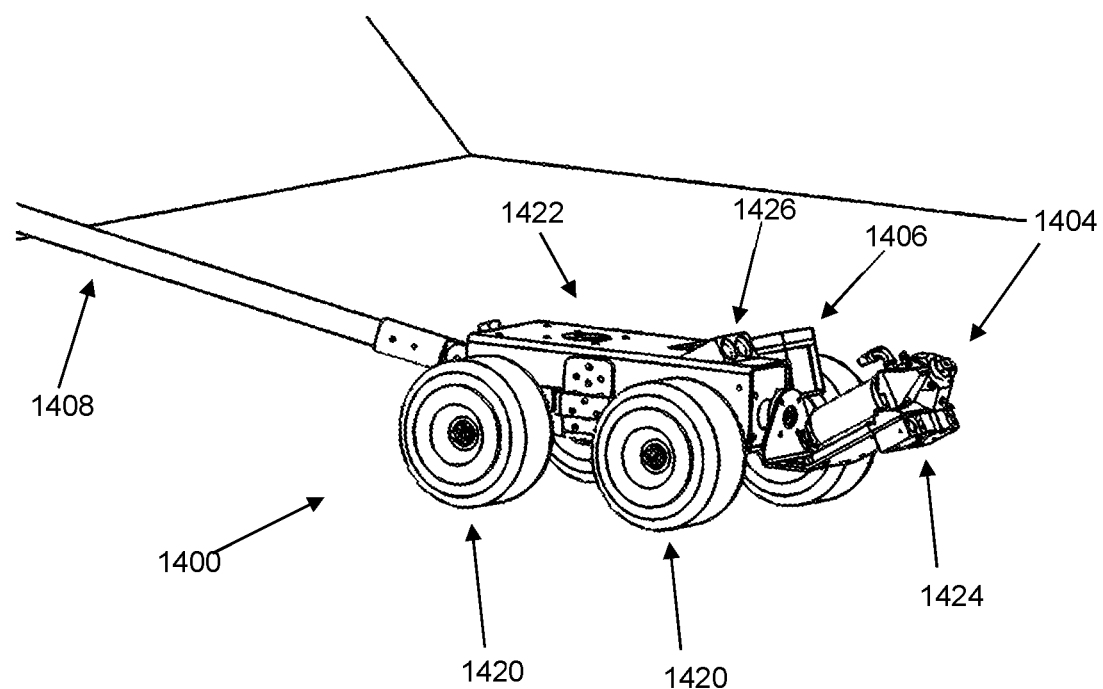

FIGS. 6 and 7 are illustrations of an embodiment of an electromechanical arm according to the present disclosure, viewed from the side, and from an isometric view respectively. The electromechanical arm 1400 is substantially as described in relation to FIG. 5, apart from the hereinafter described differences. The electromechanical arm 1400 comprises a chassis 1422, forming the main body of the electromechanical arm 1400. The chassis 1422 is provided with four wheels 1420 for easy manoeuvring of the chassis 1422. The wheels 1420 are typically not driven wheels and are free to rotate. A front end of the chassis 1422 is provided with the spray gun 1404 mounted thereto. The spray gun 1404 is mounted at an offset angle and is rotatable movable relative to the chassis 1422, whereby to move the point of aim of the spray gun 1404 through an arc. The spray gun 1404 is connected to a motor via a gearbox (not shown) mounted within the chassis 1422 for generating a rotational movement of the spray gun 1404 from an electrical signal. The angle of the gun is measured either through the control of a stepper motor, tacho mounted to the drive shaft or other means. A rear end of the chassis 1422 is connected to a handle 1408 for manoeuvring the electromechanical arm 1400. The chassis 1422 further comprises the camera 1406, mounted to observe the direction of aim of the spray gun 604. The chassis 1422 also comprises a light and range finder 1426 mounted to illuminate and produce a 3D map of the void, respectively. A pair of lasers 1424 are mounted to an underside of the spray gun 1404 for projecting a laser cross (not shown) onto a surface to be sprayed using the spray gun 1404 denoting the point of aim of the spray gun 1404. Alternatively the range finder may comprise a laser range finder (lidar) or similar device that can scan an area to build up a 3D image. As the angle of the gun and the relative position of the surface being sprayed is known the point of aim can be calculated and overlaid digitally on the operators screen. An air curtain (not shown) may be used to protect the range finder and camera from the insulation by supplying compressed air through nozzles around the camera 1406 and range finder 1426. The point of aim is configured to be observed by the camera 1406 in order to display the point of aim to an operator of the electromechanical arm 1400. The reach of the electromechanical arm 1400 may be changed by changing a length of the handle 1408, either by replacement handles of a different length or by fitting additional handle members.

Figure 8:
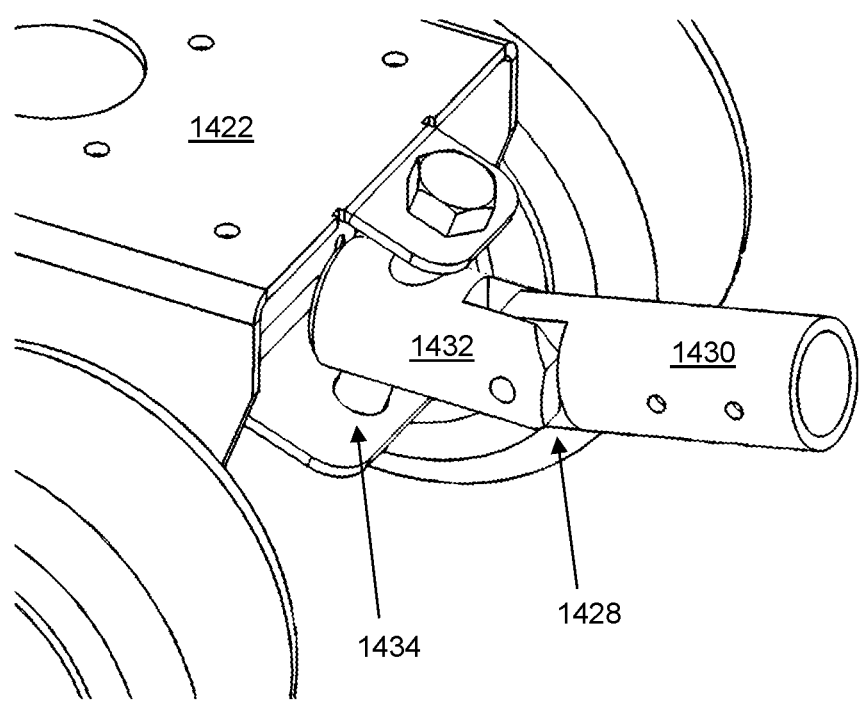

FIG. 8 is an illustration of a close up-view of a pivot joint on the electromechanical arm of FIGS. 6 and 7. The chassis 1422 of the electromechanical arm 1400 is connected to the handle 1408 through a universal joint 1428. The universal joint allows the electromechanical arm 1400 to be manoeuvred from a range of directions. The universal joint comprises a handle section 1430 which connects to the handle 1408 and a twisting section 1432 which connects to the chassis 1422. The angled section 1432 has defined therein an angled hole 1434 configured to connect the universal joint to the chassis 1422. As the handle 1408 is rotated, the twisting motion turns the chassis 1422 and therefore the spray gun 1404. This allows the operator to change the direction in which the electromechanical arm 1400 with the spray gun 1404 is pointing by rotating the handle 1408. In particular, a connecting pin is mounted in the angled hole 1434 at an angle to the chassis 1422, which ensures a rotation of the handle 1408 causes a horizontal turning of the chassis 1422.

Figure 9:
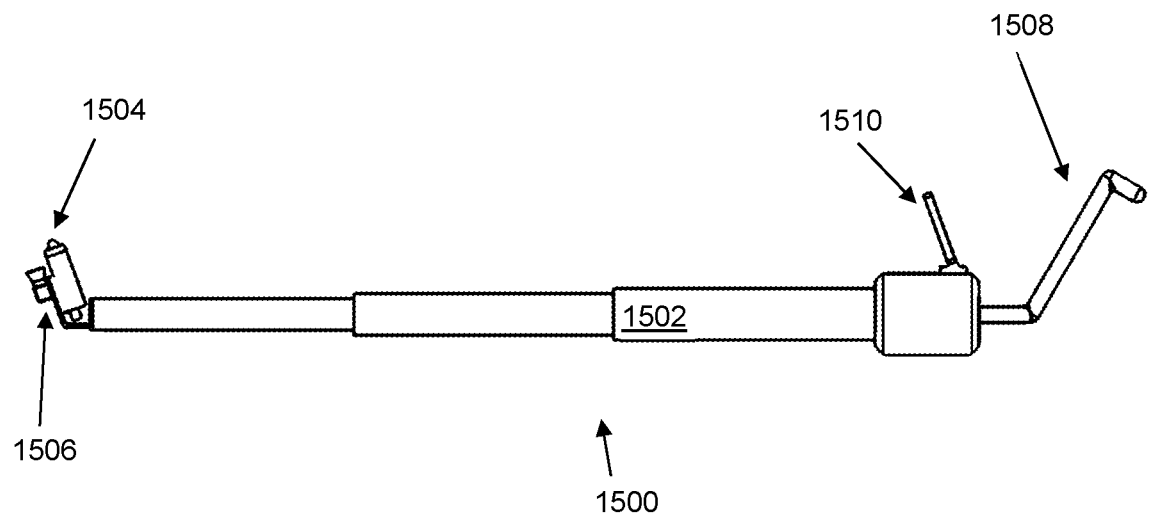
FIGS. 9 and 10 show an embodiment of an electromechanical arm according to the present disclosure.
Figure 10:
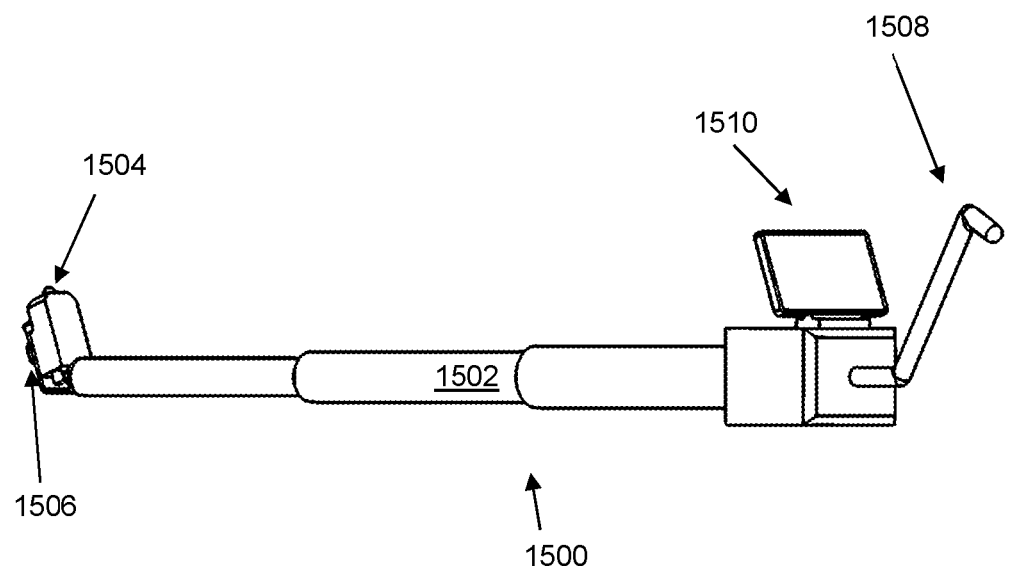

FIGS. 9 and 10 are illustrations of an embodiment of an electromechanical arm according to the present disclosure, viewed from the side and an isometric view respectively. The electromechanical arm 1500 is substantially as described with reference to FIGS. 1 and 2, but with the hereinafter described differences. The camera and range finder 1506 is mounted beneath the spray gun 1504. This mounting arrangement ensures that the camera and range finder 1506 can be protected from any debris falling onto the electromechanical arm 1500, for example, solidifying insulation foam. In this particular embodiment, the handle can be used to control both the extension of the electromechanical arm 1500 and to control the rotation of the spray gun 1504. As the camera and range finder are mounted to the gun they also rotate to follow the point of aim. The range finder provides a measurement of the material applied before and after so the thickness of coverage can be calculated. The range finder may comprise a lidar that scans a 2D plane mounted in such a way that when the gun rotates it creates a 3D scan of the area. Lifting the handle 1508 into a 90 degree position allows the extension of the arm to be adjusted. Winding the handle 1508 clockwise or anticlockwise adjusts the extension length of the extendable pole 1502 without adjusting the direction in which the spray nozzle 1504 is aiming. Furthermore, moving the handle 1508 back into an angled position between 90 degrees and 0 degrees (typically approximately 45 degrees) relative to the axis parallel to the direction of the extendable pole 1502 engages a separate mechanism to control the rotational movement of the spray gun without controlling the extension of the extendable pole 1502. The camera 1506 mounted to the base of the spray gun 1504 provides visual feedback to the operator via the display screen 1510. The spray gun 1504 is mounted at an angle of approximately 70 degrees to the horizontal.

Figure 11:
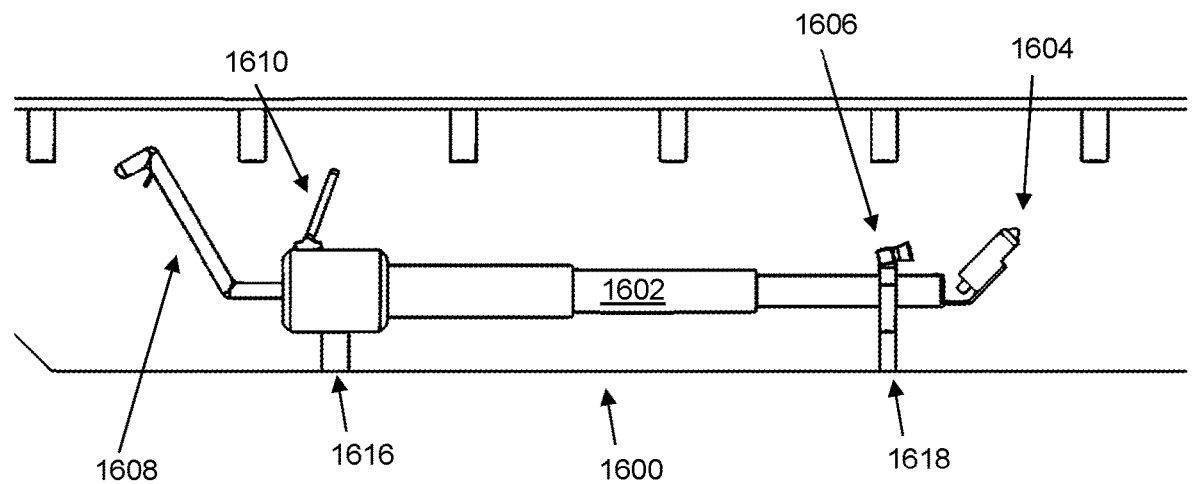
FIG. 11 shows an embodiment of an electromechanical arm according to the present disclosure.

FIG. 11 is an illustration of an embodiment of an electromechanical arm according to the present disclosure, viewed from the side. The electromechanical arm 1600 is substantially as described with reference to FIGS. 9 and 10 apart from the hereinafter described differences. The extendible pole 1602 is supported by a front stand 1618 and a rear stand 1616 which function substantially as described with reference to FIGS. 39 and 40. The spray gun 1604 is mounted at an angle of approximately 45 degrees to the horizontal.

Figure 12:
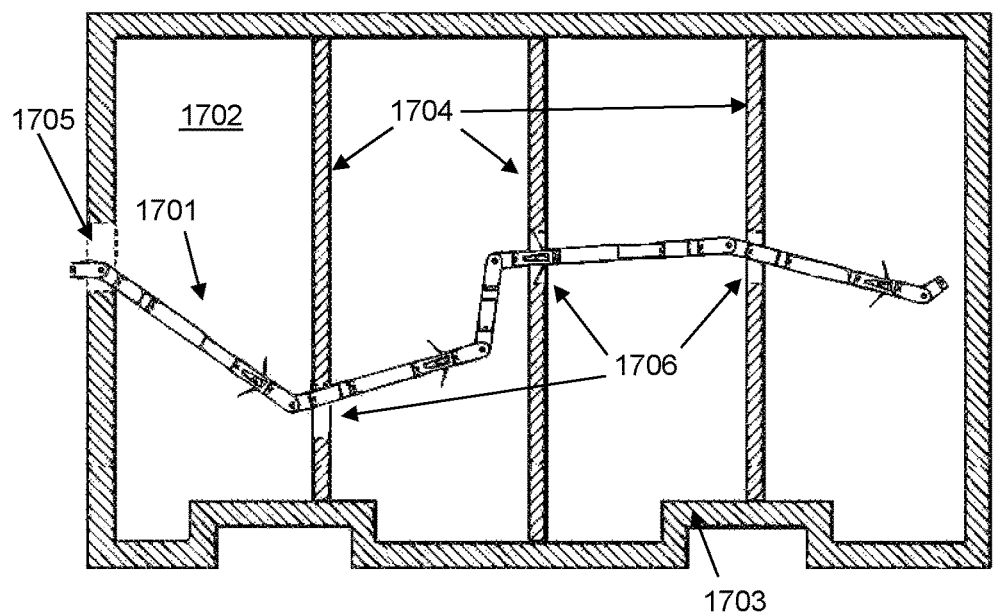
FIG. 12 shows an embodiment of a modular robot operating in an underfloor void according to the present disclosure.

FIG. 12 is an illustration of a modular robot operating in an under floor void according to one embodiment of an aspect of the present invention. A remotely controlled arm 1701 comprises multiple modules and is operating in an underfloor void 1702. The void is formed by spaces between exterior walls 1703 and internal sleeper walls 1704. Access to a first part of the underfloor void 1702 has been gained through an air vent 1705. Access to a series of further parts of the underfloor void 1702 has been gained through gaps 1706 in the sleeper walls 1704. The modules making up the remotely controlled arm 1701 include extendable chassis modules and elbow joint modules, enabling the remotely controlled arm 1701 to manoeuvre within the underfloor void 1702. In embodiments, a distal end of the remotely controlled arm 1701 may include an operating module in the form of a spray nozzle and/or a sensor turret module.

Figure 13:
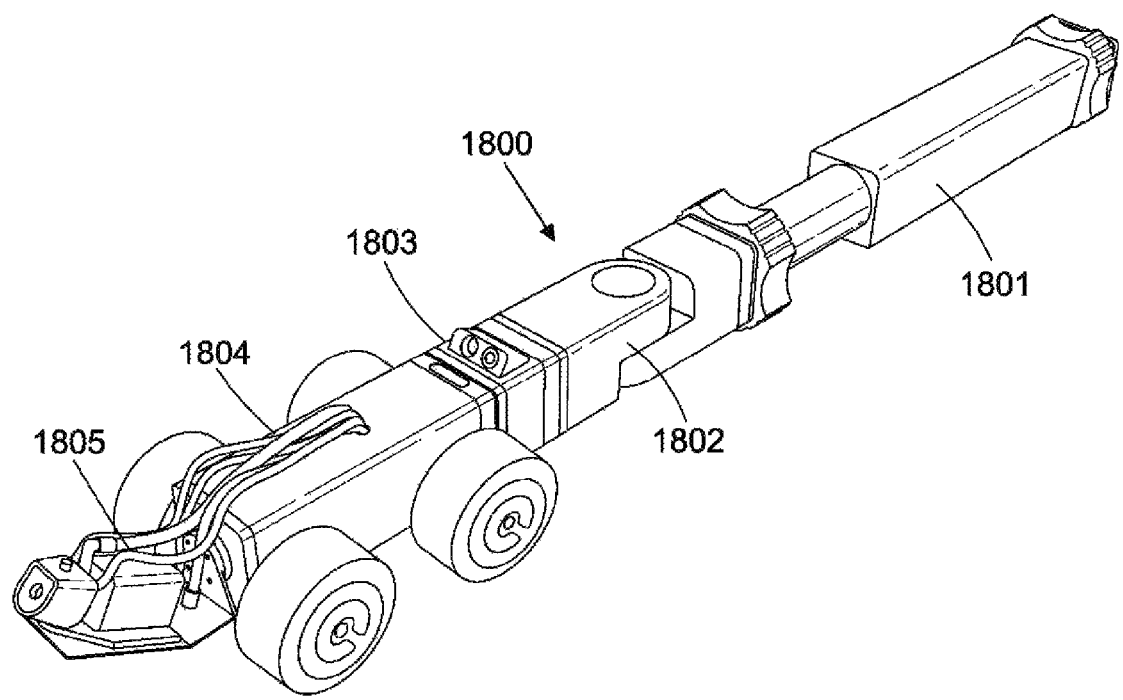
FIG. 13 shows an embodiment of a modular robot according the present disclosure.
Figure 14:
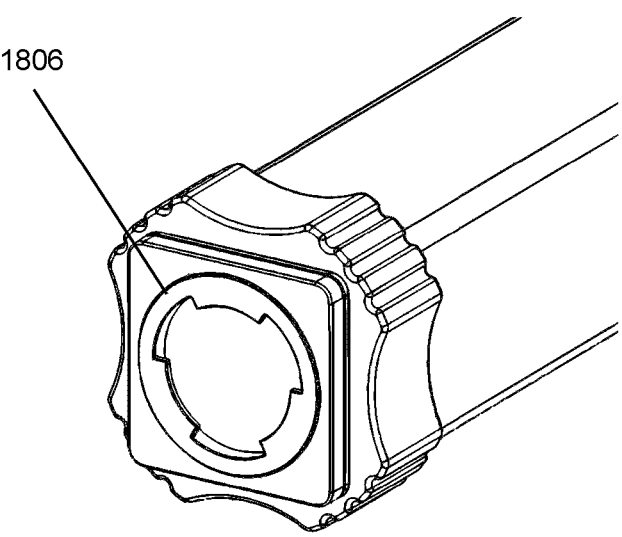
FIGS. 14 to 18 show, in isolation, various modules for the modular robot shown in FIG. 13.
Figure 15:
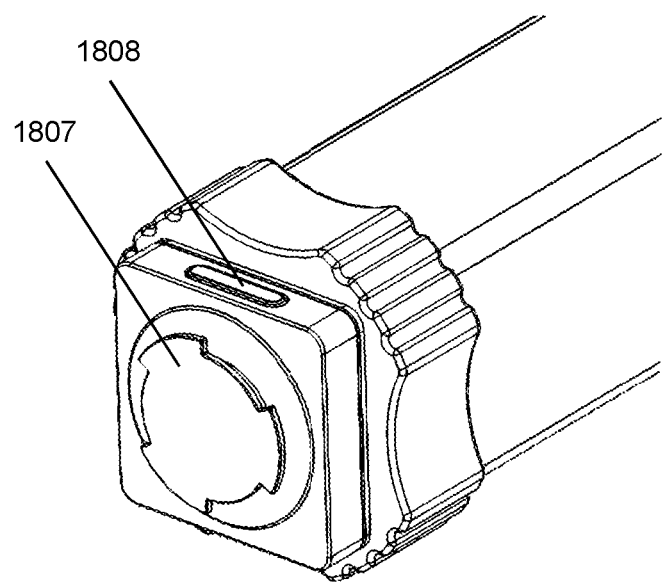

FIG. 13 is an illustration of a modular robot 1800 according to an embodiment of an aspect of the present invention. According to this embodiment, the modular robot 1800 comprises a telescopic module 1801, an elbow module 1802, a camera module 1803, a chassis module 1804 and spray gun module 1805 which are connected together to form the modular robot 1800. The particular combination of module 1801-1805 shown in FIG. 13 is merely representative of a possible combination of the modules. The modules 1801-1805 are interconnected by means of respective female connectors 1806 and male connectors 1807 to provide the modular robot shown in FIG. 13. FIG. 14 shows a female connector 1806 of the modular robot of FIG. 13 and FIG. 15 shows a male connector 1807 of the modular robot of FIG. 13. The male and female connectors 1806, 1807 interlock by insertion of the male connector 1807 into the female connector and a quarter turn. The male and female connectors then lock together and can be released by pressing a button 1808 on the male connector 1807 and rotating the connectors relative to each other. The connectors 1806, 1807 connects the respective modules together both mechanically and electrically.

Figure 16:
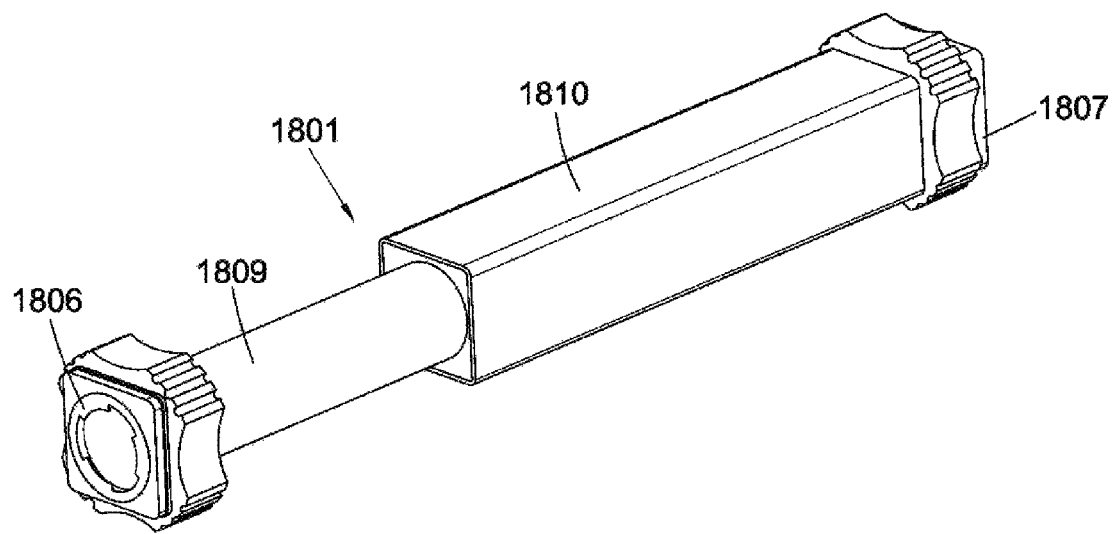

FIG. 16 shows a telescopic module 1801 of the modular robot of FIG. 13. The telescopic module 1801 comprises a first part 1809 received telescopically within a second part 1810. Extension of the telescopic module 1801 is effected by an electric motor within the first (or second) part which telescopes the first part 1809 out of the second part 1810 to extend the telescopic module 1801. The first part 1809 is engaged with the second part 1810 to prevent relative rotation therebetween about the longitudinal axis of the telescopic module 1801.

Figure 17:
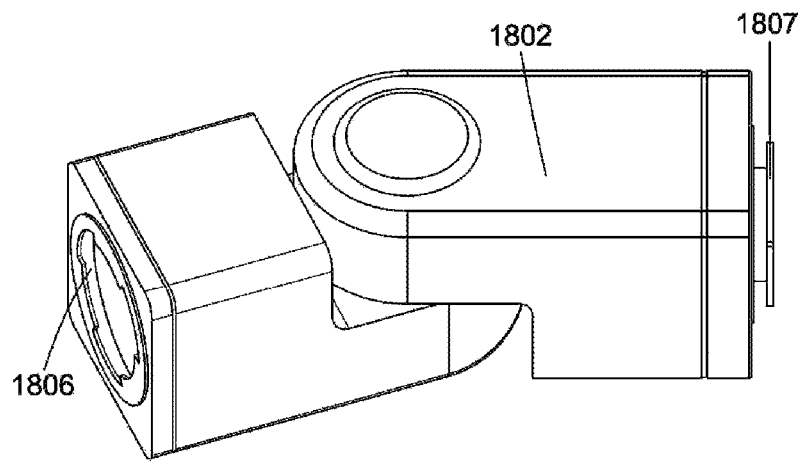

FIG. 17 shows an elbow module 1802 of the modular robot of FIG. 13. The elbow module 1802 provides a motorised joint utilising a worm gearbox connected to a stepper motor and encoder to provide accurate movement and precision feedback to the operator.

Figure 18:
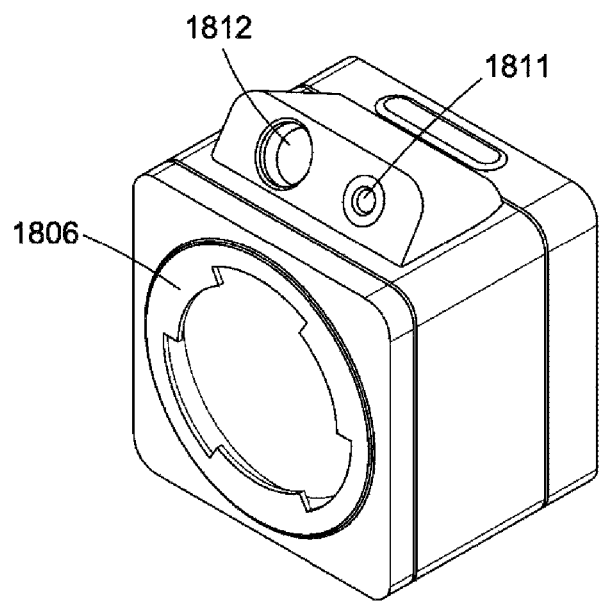

FIG. 18 shows a camera module 1803 of the modular robot of FIG. 13. The camera module 1803 is provided with a camera 1811 and an LED light source 1812 for illuminating the field of view of the camera 1811.

Figure 19:
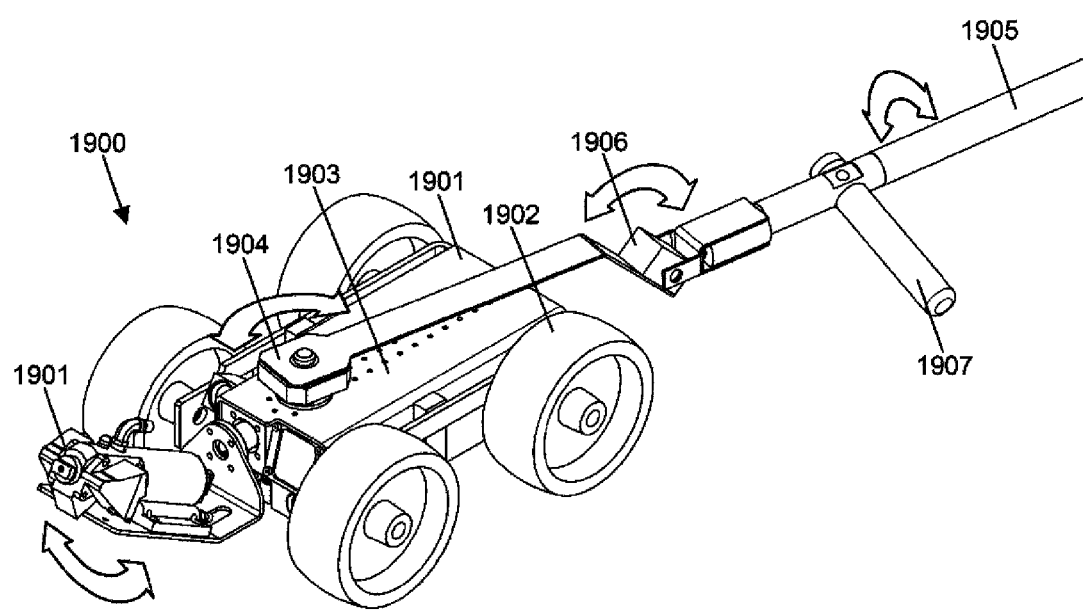
FIGS. 19 to 21C show an embodiment of a spray device according to the present disclosure.

FIG. 19 illustrates a spray device according to an embodiment of an aspect of the present invention. In this embodiment, the spray device 1900 comprises a chassis 1901 provided with four freely-rotatable wheels 1902. Holes 1903 are provided on the upper surface of the chassis 1901 for connection to a mounting connector 1904 of an elongate member, the elongate member being in the form of a control handle 1905. The mounting connector 1904 is connected to the control handle 1905 via a pivot joint 1906. A spray nozzle 1907 is mounted at the front of the chassis 1901 and is motorised to provide a required spray pattern. As indicated by the large arrows in FIG. 19, the chassis 1901 is able to pivot relative to the mounting connector 1904 about a substantially vertical axis. Similarly, the control handle 1905 is able to pivot relative to the mounting connector 1904 about a substantially horizontal axis by virtue of the pivot joint 1906. A fulcrum 1907 is provided on the control handle 1905. Rotation of the control handle 1905 about its axis changes the angular position of the fulcrum 1907.

Figure 20A:
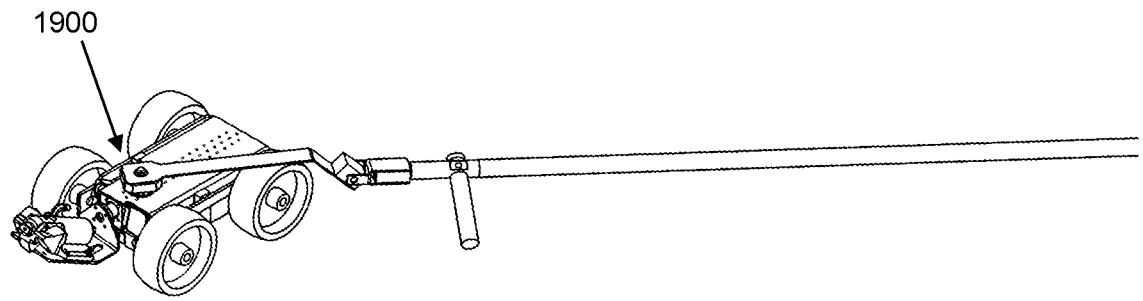
Figure 20B:
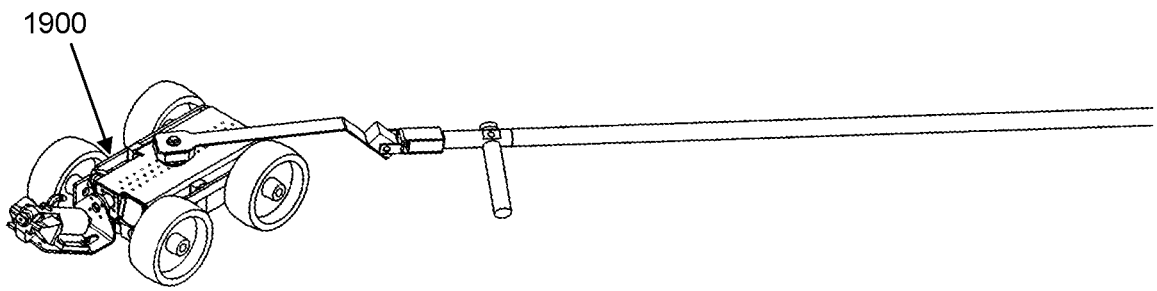
Figure 20C:
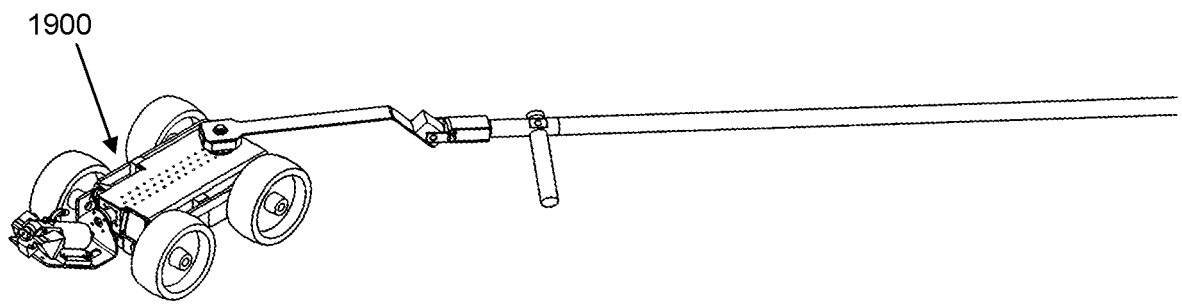

As shown in FIGS. 20A to 20C, the distribution of the holes 1903 along the length of the chassis 1901 allow the mounting connector 1904 to be mounted to the chassis 1901 in a range of positions to aid in driving the spray device across different terrain. The mounting connector 1904 can be fitted to the chassis 1901 at the front (FIG. 20A) so that the driving force from the control handle 1905 is in front of the centre of mass of the chassis. This configuration simplifies the control required from the operator when driving the spray device on terrain that would otherwise cause the vehicle direction to drift when driven from the rear. Other intermediate mounting positions along the length of the chassis are also possible including mounting the pivot at the centre of mass for a terrain-led control scheme (FIG. 20B) or at the rear of the chassis 1901 (FIG. 20C).

Even where only a single mounting position for the control handle 1905 on the chassis 1901 is provided, the control handle 1905 may be removably mounted to the chassis 1901. The removable mounting allows the control handle 1905 to be removed during insertion of the spray device 1900 through an opening of a void. The control handle 1905 can be reattached to the chassis 1901 only after the chassis 1901 is positioned within the void. In this way, it is easier to voids having smaller access openings than would be required to insert the whole spray device 1900 including the control handle 1905.

Figure 21A:
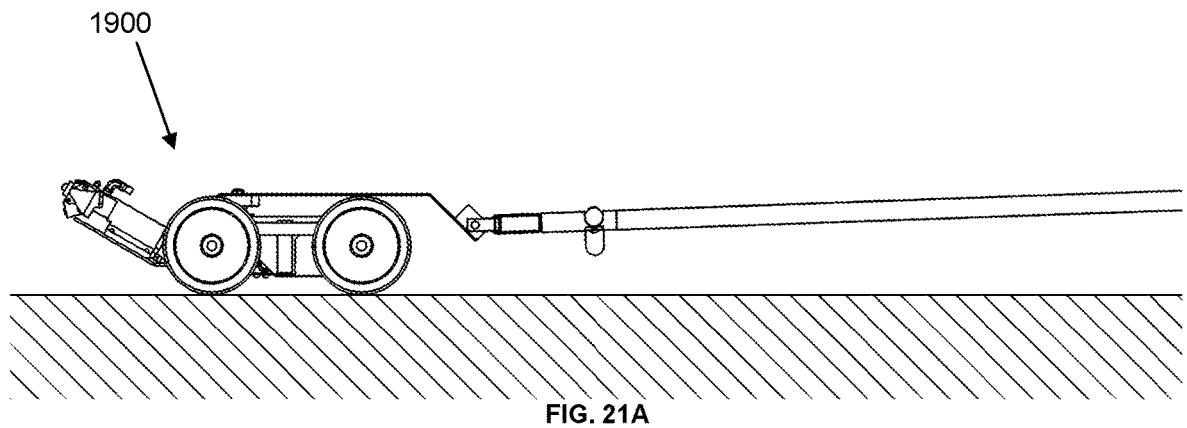
Figure 21B:
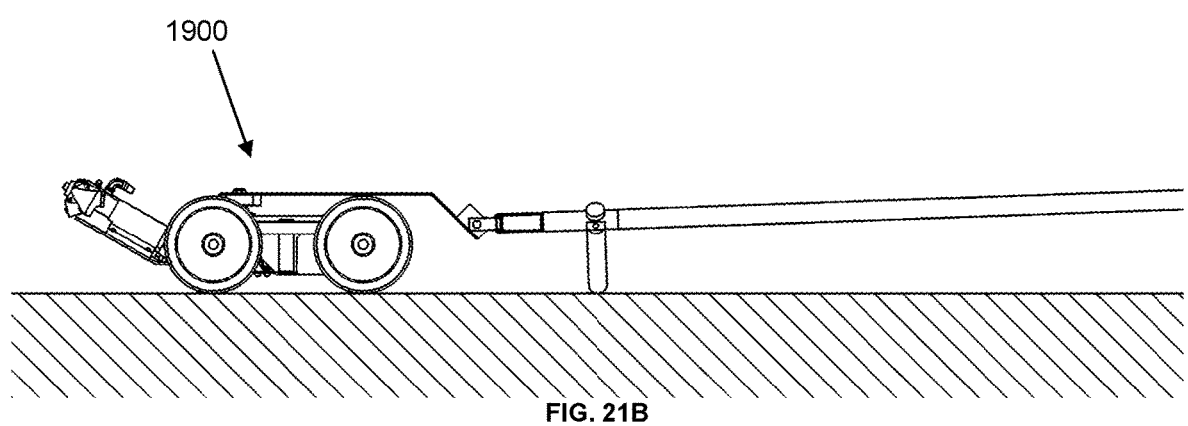
Figure 21C:
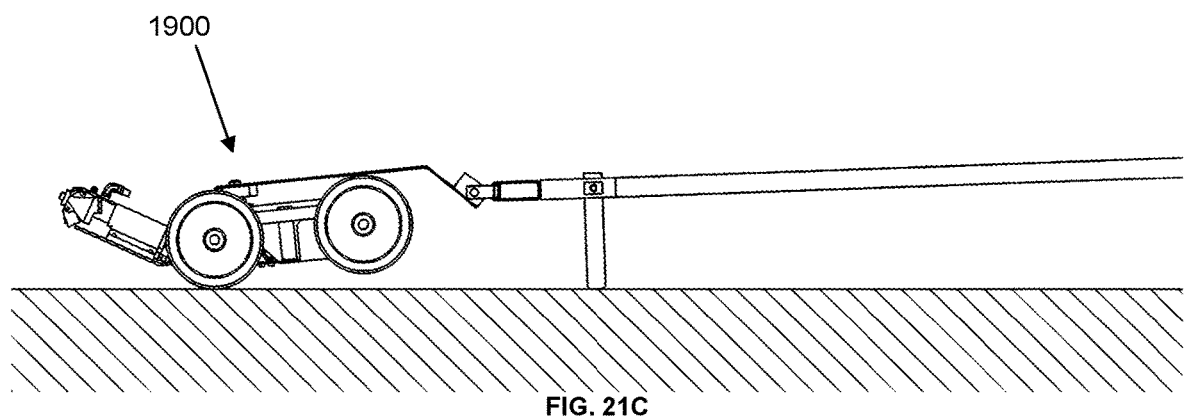

FIGS. 21A to 21C illustrate the operation of the fulcrum 1907 of the spray device 1900 of FIG. 19. As shown in FIGS. 21A to 21C, the control handle 1905 can be rotated along its length relative to the chassis. In this way, the fulcrum 1907 can be caused to engage with the ground to raise the rear wheels (FIG. 21C). This reduces the sideways ground friction of the wheels on the ground making it easy to reposition or redirect the spray device 1900.

Figure 22:
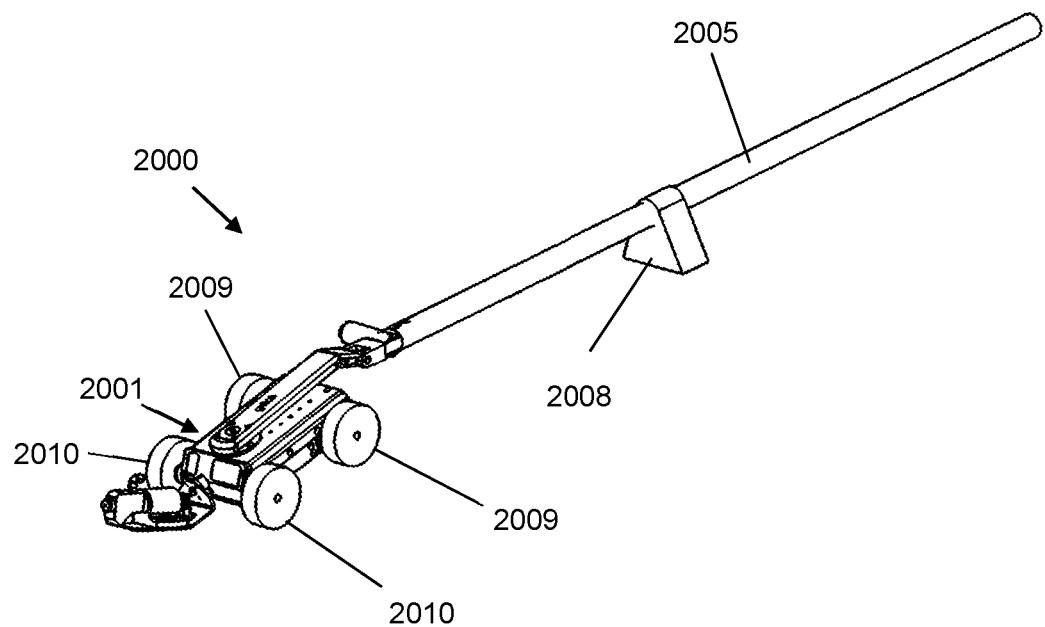
FIGS. 22 and 23 show another embodiment of a spray device according to the present disclosure.
Figure 23:
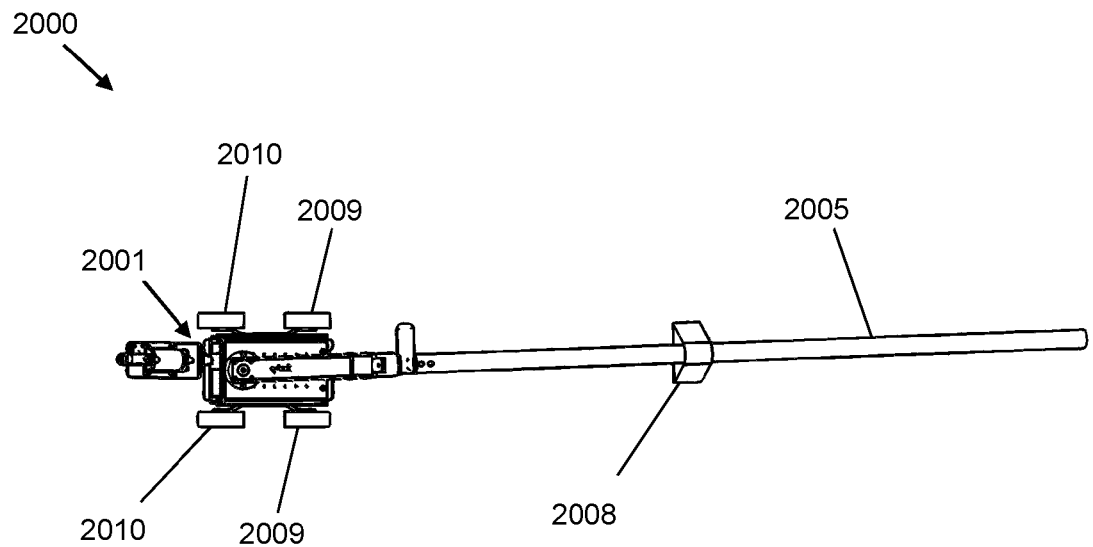

FIGS. 22 and 23 show a further example of a spray device 2000, similar to the spray device shown in FIGS. 19 to 21C apart from the hereinafter described differences. The control handle 2005 of the spray device 2000 is provided with a support member 2008 secured to the control handle 2005 and configured to extend away from the control handle 2005. In some embodiments, the support member 2008 may be positioned approximately half-way between opposite ends of the control handle 2005 and may hang down from the control handle 2005 under gravity. The support member 2008 may be rotatable freely or may be rotatably fixed to the control handle 2005. In some embodiments, the support member 2008 may be slidably mounted on the control handle 2005 whereby to be positionable at a desired location on the control handle 2005. In operation, the support member 2008 functions similarly to the fulcrum described in relation to FIGS. 21A to 21C. In particular, an end of the control handle 2005 away from the chassis 2001 is lowered towards a ground surface on which the spray device is operated until the support member 2008 is in contact with the ground. The end of the control handle 2005 is further lowered to cause a pair of rear wheels 2009 of the spray device to be raised from the ground surface, whilst a pair of front wheels 2010 remain in contact with the ground surface.

At this point, a sideways movement of the end of the control handle 2005 in an anticlockwise direction relative to the fulcrum provided by the support member 2008 results in a rotation of the chassis 2001 in a clockwise direction. The opposite sideways movement of the control handle 2005 likewise produces the opposite resulting steering movement of the chassis 2001.

Figure 24:
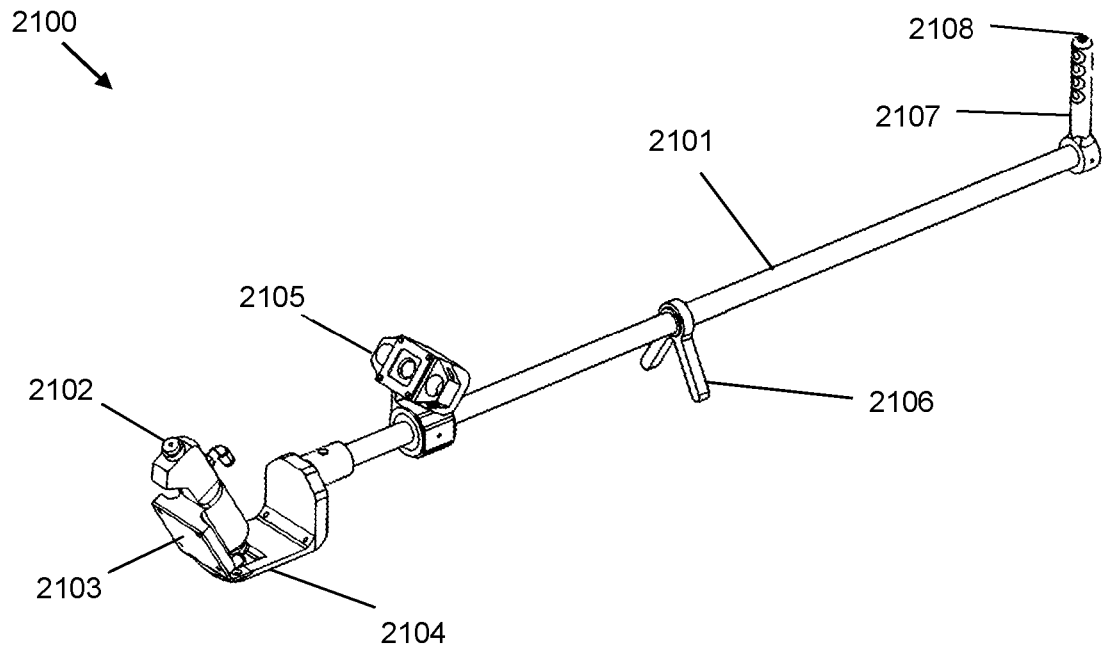
FIGS. 24 and 25 show a further embodiment of a spray device according to the present disclosure.
Figure 25:
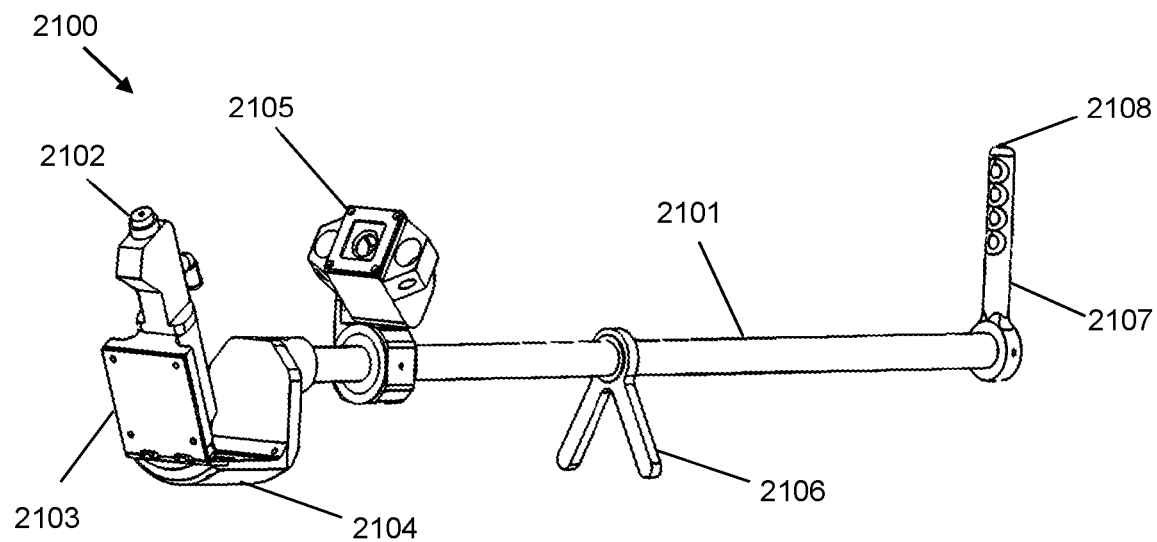

FIGS. 24 and 25 show another example of a remotely operated spray device 2100. The spray device 2100 comprises an elongate member 2101 having a distal end and a proximal end. A spray gun 2102 and a support member in the form of a ground-engaging member 2103 are provided at a distal end of the elongate member. The spray gun 2102 is mounted to the ground engaging member 2103. The ground-engaging member 2103 comprises a ground-engaging surface 2104 having a convex profile in a direction transverse to a longitudinal axis of the elongate member 2101.

The convex profile of the ground-engaging surface 2104 comprises a plurality of ground contact points each arranged to contact the ground surface at one or more of a plurality of rotation angles of the elongate member 2101 about the longitudinal axis. The ground contact points are arranged such that a rotation of the elongate member 2101 about the longitudinal axis away from a default rotational position raises a centre of mass of the spray device 2100 away from the ground surface, whereby to impart a restoring force on the apparatus to return the elongate member 2101 to the default rotational position. In particular, the convex profile is a curved profile having a smooth, low-friction surface.

The spray gun 2102 is mounted at an angle to the ground-engaging surface, whereby to direct a spray nozzle of the spray gun 2102 upwards from the ground, in use. The spray device 2100 further comprises a sensor unit 2105 fixedly mounted near the distal end of the elongate member 2101. The sensor unit 2105 includes a camera and two light sources to illuminate and image a region of the void within the range of the spray gun 2102. The camera on the sensor unit 2105 may be directed in a different direction to the spray gun 2102. The spray device 2100 further comprises a support leg 2106 mounted substantially halfway between the distal end of the elongate member 2101 and the proximal end of the elongate member 2101. The support leg 2106 freely rotates about the longitudinal axis of the elongate member 2101. The spray device 2100 further comprises a handle 2107 extending from the proximal end of the elongate member 2101 in a direction transverse to the longitudinal axis of the elongate member 2101. The handle 2107 extends substantially vertically upwards in a default position of the spray device 2100. The handle 2107 includes a grip portion and comprises an operating switch 2108 positioned at a tip of the handle 2107.

In operation, an operator may rotate the elongate member 2101 of the spray device 2100 by rotating the handle 2107. Rotation of the elongate member 2101 causes rotation of the ground-engaging member 2103, thereby causing the spray nozzle of the spray gun 2102 to sweep out an arc for spraying material from the spray gun 2102. In embodiments, the support leg 2106 may remain in contact with a ground surface and act as a ground support for the spray device 2100. When the proximal end of the elongate member 2101 is elevated by an operator by lifting the proximal end of the elongate member 2101 (for example, by the handle 2107), the ground-engaging surface 2104 of the ground-engaging member 2103 contacts the ground surface. By raising or lowering the proximal end of the elongate member 2101, the angle of the spray nozzle of the spray gun 2102 relative to the ground surface may be varied. Again, rotating the elongate member 2101 using the handle 2107 causes the spray nozzle of the spray gun 2102 to trace an arc for spraying material from the spray gun 2102.

The electromechanical arm and spray gun of the present disclosure may be used in a variety of applications, for example in the spraying of underfloor insulation or loft and roof insulation, i.e. applying insulation in hard to reach loft and ceiling voids. The arm can also be used for the remote application of sound insulation in voids and cavities, for example between floors of converted period flats. The arm and spray gun can also be used for the application of preservatives, such as applying anti-fungicides and preservatives to wood and other materials. The arm and spray gun may be used industrially, for example for applying paint, protective coatings, sealant or carrying out other maintenance and repairs to cracked or damaged pipes, storage tanks and other industrial structures. The arm may be used for building inspection and maintenance, including surveying, mapping and investigating hazardous 'crawl spaces' e.g. asbestos surveying or checking wiring; surveying services e.g. mapping pipe work and checking for leaks; and structural surveys. The arm may be used for infrastructure inspection and maintenance, for example surveying sewer or gas pipes, inspecting pressure tanks, etc.

Materials that may be sprayed include polyurethane spray foam, e.g. BASF's Walltite, which is an expanding two part insulation material, blown mineral wool (such as the COAT-WOOL product available from Saint-Gobain of Suresnes, France) or cellulose insulation with or without a binding agent so it adheres to a surface, spray aerogel insulation coatings, sound insulation material, anti-fungicidal preservatives, coatings and paints.

Although the presently described embodiments have been described in relation to use in an underfloor void, it will be appreciated that the electromechanical arms disclosed may be used in other voids. For example, voids between floors, voids between walls. Typically, the electromechanical arm will be used in voids known as crawl spaces, which refers to all kinds of spaces where it would be difficult to send a person.

In accordance with an invention disclosed herein there is provided a device for mounting a spray nozzle, the device comprising an elongate member provided at a proximal end with a handle and at a distal end with a mounting for a spray nozzle, wherein the device further comprises a ground-engaging member mounted to the elongate member arranged to facilitate translational movement of the device over a ground surface, wherein the ground-engaging member is fixed relative to the elongate member in the longitudinal direction thereof. The elongate member may be extendable.

An additional application of the remotely operated device is for loft and roof insulation. The remotely operated devices of the present disclosure may be used for applying insulation in hard to reach loft and ceiling voids. In another application, the remotely operated devices may be used to apply sound insulation. In particular, the remotely operated devices are suited with assisting in the remote application of sound insulation in voids and cavities, for example between floors of converted period flats.

Additionally, the remotely operated devices may be used to apply preservatives. Anti-fungicides and preservatives can be applied to wood and other materials.

In some industrial applications, the remotely operated devices may be used to apply paint, protective coatings, sealant or carry out other maintenance and repairs to cracked or damaged pipes, storage tanks and other industrial structures.

As well as spraying insulating foam, it will be appreciated that the remotely operated devices may apply other materials. The remotely operated devices may apply blown mineral wool or cellulose insulation with or without a binding agent so it adheres to a surface. For the blown mineral wool, an adhesive can be added at the nozzle through a jet of air that also acts to propel the insulation.

In some embodiments, the remotely operated devices may apply spray aerogel insulation coatings or sound insulation.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for spraying an insulation material on a void having a ground surface, comprising:
   an elongate member having a distal end and a proximal end, and defining a longitudinal axis;
   a spray nozzle rotatably and mechanically mounted at the distal end for spraying the insulation material in a spray pattern, wherein rotation of the elongate member about the longitudinal axis sweeps a path of the spray nozzle through an arc;
   a ground-engaging member mounted at the distal end and arranged to facilitate translational movement of the apparatus over the ground surface in response to pushing the elongate member in a direction of the longitudinal axis and in response to pulling the elongate member in a direction of the longitudinal axis;
   a camera mounted at the distal end and connected to a camera output, the camera adapted to create a captured image of the spray pattern and the camera output adapted to facilitate viewing of the captured image from the proximal end of the elongate member; and
   a control mechanism adapted to control the spray nozzle from the proximal end of the elongate member.

2. The apparatus as claimed in claim 1, wherein the ground-engaging member includes a support member provided with any one of a sled, a ball and wheels.

3. The apparatus as claimed in claim 2, wherein the sled defines a ground-engaging surface adapted to contact the ground surface and is slidable relative to the ground surface, in use, and is rigidly connected to the elongate member.

4. The apparatus as claimed in claim 3, wherein the ground-engaging surface is smooth.

5. The apparatus as claimed in claim 4, wherein the ground-engaging surface is a low friction surface.

6. The apparatus as claimed in claim 3, wherein the ground-engaging surface defines a convex profile in a direction transverse to a longitudinal axis of the elongate member.

7. The apparatus as claimed in claim 3, wherein the ground-engaging surface comprises a plurality of ground contact points, wherein each of the contact points is each arranged to contact the ground surface at any one or more of a plurality of rotation angles of the elongate member about the longitudinal axis.

8. The apparatus as claimed in claim 7, wherein each of the ground contact points is arranged such that a rotation of the elongate member about the longitudinal axis away from a default rotational position raises a centre of mass of the apparatus away from the ground surface, whereby to impart a gravitational restoring force on the apparatus to return the elongate member to the default rotational position.

9. The apparatus as claimed in claim 2, wherein the support member includes a wheeled unit.

10. The apparatus as claimed in claim 9, wherein the wheeled unit includes freely rotating wheels for engaging the ground.

11. The apparatus as claimed in claim 9, wherein the wheeled unit includes a front wheel set and a rear wheel set and wherein the apparatus further comprises a further support member mounted between the distal end and the proximal end of the elongate member and is arrangeable to function as a fulcrum to suspend the rear wheel set away from the ground surface, whereby to steer the wheeled unit.

12. The apparatus as claimed in claim 1, wherein the spray nozzle is adapted to be mounted at an angle relative to the ground surface.

13. The apparatus as claimed in claim 12, wherein the angle is selectable from any one of a plurality of predefined angles.

14. The apparatus as claimed in claim 12, wherein the spray nozzle is mounted to the ground-engaging member.

15. The apparatus as claimed in claim 1, further comprising a handle disposed at the proximal end of the elongate member.

16. The apparatus as claimed in claim 1, wherein at least a portion of the elongate member is removably attached to the ground-engaging member.

17. The apparatus as claimed in claim 1, wherein the elongate member is extendable, whereby to extensibly connect the proximal end and the distal end of the elongate member.

18. The apparatus as claimed in claim 1, wherein the spray nozzle is connected to a spray material input.

19. The apparatus as claimed in claim 18, wherein the spray material input is connected to a reservoir of insulation material.

20. The apparatus as claimed in claim 1, wherein the camera output is disposed at the proximal end of the elongate member.

21. Apparatus for spraying an insulation material on a void having a ground surface, comprising:
   a motor having a motor shaft;
   an elongate member having a distal end and a proximal end, and defining a longitudinal axis;
   a spray nozzle mounted at the distal end and mechanically connected to the motor for spraying the insulation material in a spray pattern, wherein rotation of the motor shaft sweeps a path of the spray nozzle through an arc;

a ground-engaging member mounted at the distal end and arranged to facilitate translational movement of the apparatus over the ground surface in response to pushing the elongate member in a direction of the longitudinal axis and in response to pulling the elongate member in a direction of the longitudinal axis;

a camera mounted at the distal end and connected to a camera output, the camera adapted to create captured images of the spray pattern and the camera output adapted to facilitate viewing of the captured image from the proximal end of the elongate member; and a control mechanism adapted to control the spray nozzle from the proximal end of the elongate member.

* * * * *